United States Patent [19]

Ahearn et al.

[11] 3,781,808

[45] Dec. 25, 1973

[54] VIRTUAL MEMORY SYSTEM

[75] Inventors: Thomas P. Ahearn, Poughkeepsie; Robert S. Capowski, Verbank; Neal T. Christensen, Poughkeepsie; Patrick M. Gannon, Poughkeepsie; Arlin E. Lee, Poughkeepsie; John S. Liptay, Poughkeepsie, all of N.Y.

[73] Assignee: International Business Machines Corporation, Armonk, N.Y.

[22] Filed: Oct. 17, 1972

[21] Appl. No.: 298,190

[52] U.S. Cl. .............................................. 340/172.5

[51] Int. Cl. ......................... G06f 13/00, G11c 9/00

[58] Field of Search .................................. 340/172.5

[56] References Cited

UNITED STATES PATENTS

| | | | |
|---|---|---|---|
| 3,569,938 | 3/1971 | Eden et al. | 340/172.5 |
| 3,611,316 | 10/1971 | Woodrum | 340/172.5 |
| 3,670,310 | 6/1972 | Bharwani et al. | 340/172.5 |
| 3,675,215 | 7/1972 | Arnold | 340/172.5 |
| 3,685,020 | 8/1972 | Meade | 340/172.5 |
| 3,693,165 | 9/1972 | Reiley et al. | 340/172.5 |
| 3,699,533 | 10/1972 | Hunter | 340/172.5 |
| 3,701,107 | 10/1972 | Williams | 340/172.5 |
| 3,701,984 | 10/1972 | Burns | 340/173 R |

*Primary Examiner*—Paul J. Henon
*Assistant Examiner*—James D. Thomas
*Attorney*—James E. Murray et al.

[57] ABSTRACT

This specification describes a virtual memory system in which a set of conversion tables is used to translate an arbitrarily assigned programming designation called a virtual address into an actual main memory location called a real address. To avoid the necessity of translating the same addresses over and over again, a table called the Directory Look Aside Table (DLAT) retains current virtual to real address translations for use where particular virtual addresses are requested more than once. Each translation retained by the DLAT is identified by an identifier (ID) that signifies the set of tables used in that translation. This identifier is compared with an identifier generated for the currently requested virtual address. If these identifiers match and the virtual address retained in the DLAT matches the currently requested virtual address, the translation stored in the DLAT may be used. If the identifiers or virtual address don't match, a new translation must be performed using the set of conversion tables associated with the currently requested address.

4 Claims, 10 Drawing Figures

VIRTUAL MEMORY SYSTEM

INTRODUCTION

Background of the Invention

This invention relates to computer storage systems and more particularly to computer storage systems including a virtual memory system for converting a virtual address to a real physical address.

Various techniques are known whereby several computer programs, executed either by a single central processing unit or by a plurality of processing units, share one memory. A memory being shared by programs in this manner requires an extremely large storage capacity, a capacity which is often larger than its actual capacity. To accommodate this situation the concept of "virtual storage" is employed. If, for example, a system employs a 24 bit addressing scheme $2^{24}$ bytes or approximately sixteen million addressable bytes of virtual storage are available. This virtual storage is divided into segments each of which is divided into pages, with each page consisting of a predetermined number of bytes. The segment and page addresses assigned to virtual storage are arbitrary programming designations and are not actual locations in main storage. Therefore, virtual segments and pages can be located randomly throughout main storage and swapped in and out of main storage as they are needed.

Random location of segments and pages in main storage necessitates the translation of virtual address into actual address using a set of conversion tables that are located in main storage. In a virtual memory system a number of sets of conversion tables, are employed, each made of of a segment table and a number of page tables. Each page table in a set of conversion tables reflects the real locations of all the pages of one segment in the segment table. Therefore, if a particular segment table is divided into 16 segments, there would be 16 page tables and one segment table in the set of conversion tables in performing a translation.

In making a translation, the proper set of conversion tables is selected and the segment table in the set of conversion tables is used to find the location of the page tables in the real memory. The proper page table is then used to find the real location of the addressed page. The byte portion of a virtual address refers to a real location in memory so that once the segment and page portions of the virtual address have been translated to give a page location the byte portion is concatenated onto the page location to give the real address in main storage.

To avoid having to translate an address each time the memory is accessed, current translations of virtual addresses to real addresses are retained in another table called the Directory Look Aside Table (DLAT) where such addresses can be obtained with a virtual address without going through the described translation process. The use of the DLAT significantly reduces the number of translations that must be made and thus has a considerable effect on the performance of the virtual memory system. It does, however, introduce the possibility of error in that the conversion tables used in deriving the real addresses stored in the DLAT may not be the same as that associated with the data currently being paged. Therefore, even though there may be a match between the virtual address of the current paged data and one of the translations stored in the DLAT, the real address associated with the stored translation is the wrong address. One solution to this problem would be to erase all the translations stored in the DLAT each time new selected translation tables are used. However, this would slow down machine operation considerably since there is a significant increase in the amount of translation that must be done using the translation tables.

Summary of the Present Invention

In accordance with the present invention, the problem referred to above is overcome by storing an identifier (ID) for each translation in the DLAT. This identifier signifies the set of tables used in making the translation. In interrogating the DLAT this stored identifier is compared with an identifier generated for the currently requested virtual address. If the virtual address and identifiers of the currently requested address match those for a translation stored in the DLAT, the translation stored in the DLAT may be used. If the identifiers or virtual addresses do not match a new translation must be performed using the set of conversion tables associated with the currently requested address. The equipment used in generating the identifiers for translations stored in the DLAT can also perform other functions. For instance, it can be used to distinguish between virtual addresses having different page and segment sizes and, in addition, can be used to indicate that a real address is being employed instead of a virtual address.

Therefore, it is an object of the present invention to prevent errors from occurring in the translation of virtual addresses to real addresses.

Another object of the present invention is to prevent errors from occurring in translation due to the use of more than one conversion table.

Other objects of the invention are to prevent translation errors due to changes in size of page and segment portions of the virtual address and to permit the same memory to be accessed by both virtual and real memory addresses.

The foregoing and other objects, features and advantages of the present invention will be apparent from the following description of a preferred embodiment of the invention as illustrated in the accompanying drawings of which:

DETAILED DESCRIPTION

Figures 1, 2, 3, 5:
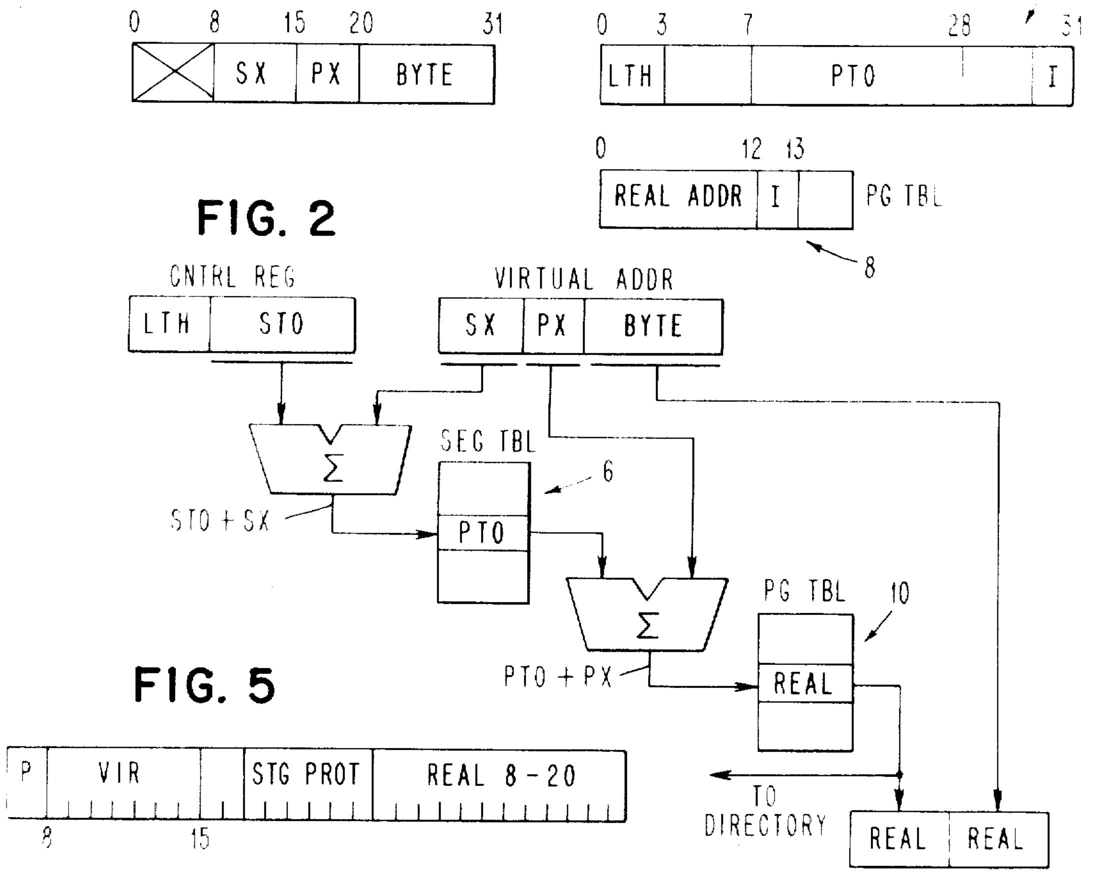
FIG. 1 shows a preferred format for a virtual address.
FIG. 2 is a diagramatic representation of virtual-to-real address translation.
FIG. 3 shows preferred formats for segment table entries and page table entries.
FIG. 5 is a preferred format for entries in a Translation Look Aside Table which forms one part of this invention.

Since the invention resides primarily in the novel structural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

Virtual Address

Referring to FIG. 1, a preferred format for a virtual address is shown. The 24 bit virtual address is divided into three fields: a segment field (SX) which occupies bits 8–15; a page field (PX) which occupies bits 16–20; and a byte field which occupies bits 21–31. With this format, the virtual storage consists of 256 segments, with each segment consisting of up to 32 pages, and each page consisting of up to 2,048 bytes. Those skilled in the art will, of course, recognize that these field definitions are somewhat arbitrary in nature. For example, one could define the virtual address fields so that SX occupies bits 8–11, PX occupied bits 12–19, and BYTE occupied bits 20–31. With such a format, the virtual storage would consist of sixteen segments with each segment consisting of up to 256 pages, and each page consisting of up to 4,096 bytes. Bits 0–7 are not used in this preferred embodiment, but could optionally be used to extend the virtual address to provide a 32 bit addressing system. Such a system would have over four billion bytes of virtual memory. The segment field serves as an index to an entry in the segment table. The segment table entry contains a value which represents the base address of the page table associated with the segment designated by the segment field. The page field serves as an index to an entry in the page table. The page table entry contains a value which represents the actual or real address of the page. The byte field undergoes no change during translation, and is concatenated with the translated page address to form the actual or real main storage address.

Address Translation

The translation process will be further clarified by reference to FIG. 2. The translation process is a two-level table look-up procedure involving segment and page tables from main storage. The segment address portion (SX) of the virtual address is added to a Segment Table Origin (STO) address stored in a control register 2 in order to obtain a segment table entry 4 from the segment table 6. (Control register 2 will also generally contain the length [LTH] of the segment table.) This segment table entry will contain a Page Table Origin (PTO) address which is added to the page address portion (PX) of the virtual address to provide the address of a page table entry 8 within the page table 10. Page table entry 8 will contain a real address which is cancatenated with the byte portion of the virtual address to form the real address of a byte of data. To avoid repeating this translation process for every storage reference, a directory is provided for storing the SX portion of the virtual address along with the corresponding real address which was read from the page table with that segment. The directory will be continually updated to contain the virtual and real page addresses of recently referenced pages. Consequently, at the beginning of a translation, the virtual page address under translation will be checked against the directory to see if the real address is already available. If it is, the directory will provide the real page address which will be concatenated with the byte portion of the virtual address to form the real main storage address. If the address under translation is not found in the directory, it will undergo translation as described above and will be placed in the directory along with its real address.

FIG. 3 shows a preferred embodiment for segment table entries 4 and page table entries 8. For each virtual address space, there is a segment table, with corresponding page table. The origin and length of the active segment table is contained in the control register (FIG. 2). The segment table entry 4 contains a length (LTH) field in bits 0–3 which designates the length of the page table in increments that are equal to a sixteenth of the maximum size. Bit 31, the I bit, indicates the validity of the information contained in the segment table entry. When the I bit is on, the entry cannot be used to perform translations. The page table entry 8 contains, in bit positions 0–12, the high order 13 bits of the real storage address. (The low order real bits of the virtual address are concatenated to the higher order bits from the page table to provide the byte displacement within the page.) There is also an I (invalidity) bit associated with each page table entry. When the I bit is on, the entry cannot be used to perform translations.

Directory Look Aside Table (DLAT)

Figure 4:
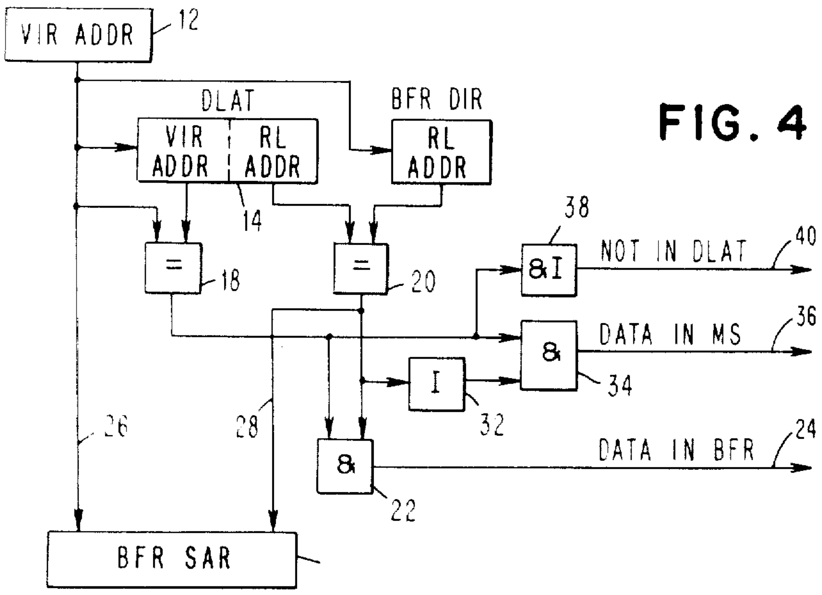
FIG. 4 is a block schematic diagram illustrating the relationship between the translation process and elements of a preferred embodiment of this invention.

To avoid having to translate an address each time the memory is accessed, current translations of virtual addresses to real addresses are retained in a table called the Directory Look Aside Table (DLAT). As shown in FIG. 4, the virtual address 12 provided by the CPU simultaneously interrogates the Directory Look Aside Table (DLAT) 14 and a directory 16 for the buffer of the memory. The DLAT 14 contains recently translated virtual addresses along with their corresponding real addresses, while buffer directory 16 contains the real addresses of data that have been mapped into the high speed buffer. The tables contained in the DLAT and in the buffer directory may be arranged and accessed in any of several known manners. For example, each could be an associative storage array, or an addressable storage array that is addressed by bits contained in the virtual address where the DLAT is addressed by bits coming from the virtual portion of the address and the directory is accessed by bits coming from the real portion of the address.

To check to see that the DLAT has been properly accessed, a portion of the virtual address is read from the virtual address portion of the DLAT and compared to the corresponding portion of the CPU-provided virtual address 12 by a comparator 18. Likewise, to ensure that the data mapped into the high speed buffer is the data requested by the virtual address 12, the real address read from the DLAT 14 is compared to the real address read from the buffer directory 16 by comparator 20.

The outputs of comparators 18 and 20 are fed to an AND circuit 22, which will generate an output signal on line 24 if the requested data is in the high speed buffer. Appropriate portions of the virtual address and the real address will be fed via lines 26 and 28 to the buffer storage address register 30 so that the data may be addressed from the buffer. If a real address which corresponds to the virtual address 12 is contained in the DLAT 14, but the data is not in the high speed buffer, the output of comparator 20, after inversion by inverter 32, combined with the output of comparator 18 will cause AND circuit 34 to generate a signal on line 36 indicating that a main storage reference is required. If the virtual address 12 does not match a virtual address contained in DLAT 14, the output of comparator 18 will cause AND-I invert circuit 38 to generate a signal on line 40 which will indicate to the system that the translation process described above with respect to FIG. 2 must be initiated. Specific implementations of the manner in which the contents of buffer storage address register 30 and the signal on line 24 may be used to initiate a buffer access cycle, as well as the manner in which the signals on lines 36 and 40 may be used to initiate appropriate system responses, are well known to those skilled in the art and need not be described herein.

Figure 6A:
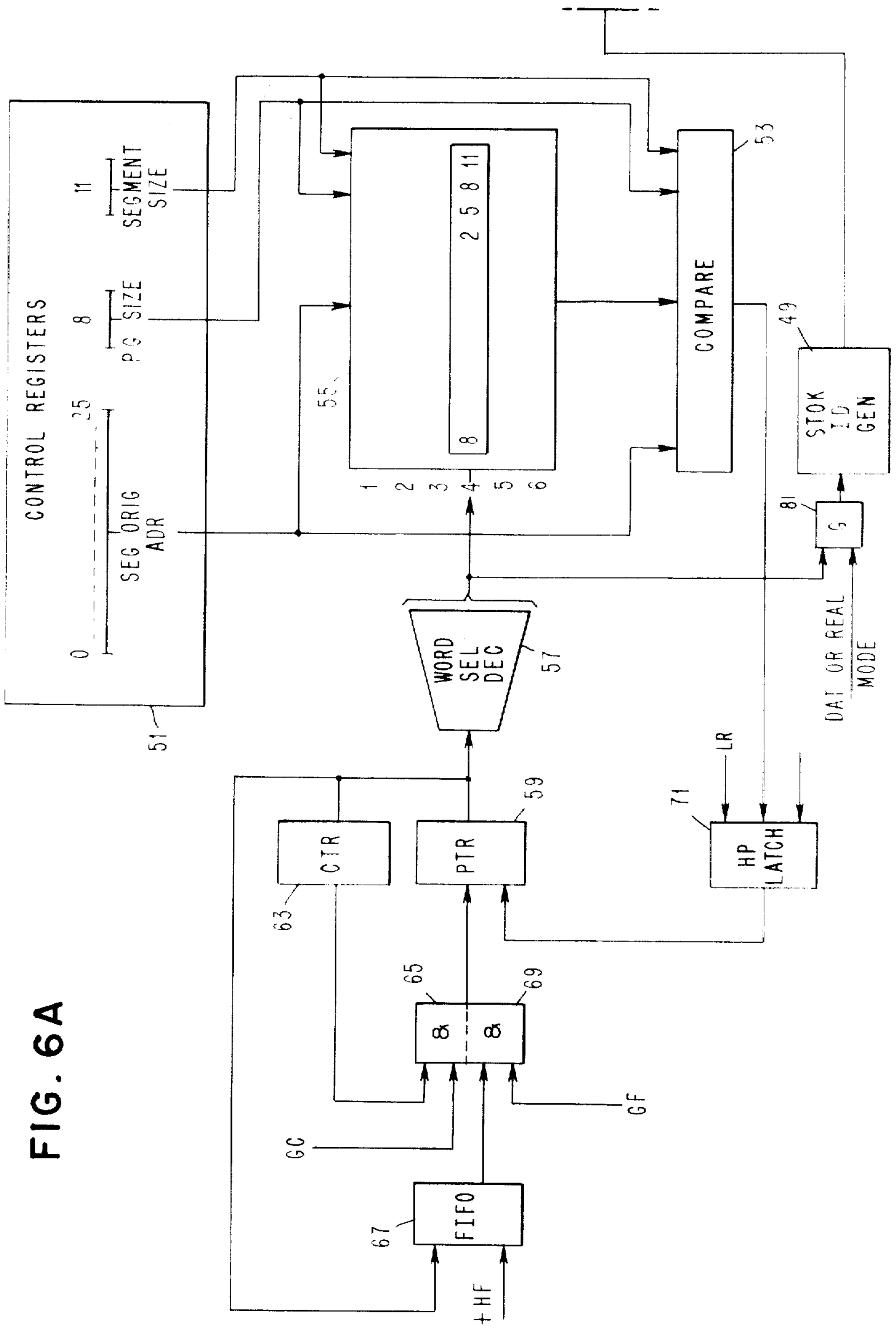
FIGS. 6*a* and 6*b* are block schematic diagrams of the preferred embodiment of the invention.

As shown in FIG. 6, the Translation Look Aside Table 46 contains 64 words, each of which contains two virtual address entries along with their respective real address entries. Some of the details of the format of a DLAT entry are shown in FIG. 5. As shown, a 12 bit portion of each entry contains bits 8 – 15 of some virtual address, the 10 real address bits that form the translation of the SX and PX portions of that virtual address. In addition, each DLAT entry contains a parity bit P, six bits, and three bits, labeled ID, that are generated in accordance with the present invention and described hereinafter.

Prefixing in the DLAT

The real address bits stored in the DLAT 46 are not the real address bits obtained by the described translation process, but slightly modified versions of these addresses obtained by a process called prefixing. Prefixing is a procedure used in multiprocessing to permit more than one processor to access a particular memory without effecting each other's status information. The status information is usually stored in a particular part of memory. Prefixing constitutes changing addresses by one bit to avoid the data of one processor from destroying one status information from another. The present embodiment of applicant's invention relates to a multiprocessing machine in which prefixing is used so that the data in main memory is obtained by prefixed addresses. Therefore, all real addresses are prefixed by prefix logic 45 on data received from a prefix register 47 before being entered into the DLAT 14 so that absolute addresses are available from the DLAT to compare against the absolute addresses contained in the buffer directory 56. Prefixing is a well known technique and does not constitute a part of the present invention and, therefore, will not be gone into in detail here.

Data Protection Keys in DLAT

Storage protect keys are retained in the DLAT to determine if accessibility of the buffer entries is allowed without first having to check the protection key against the processor storage protection array. Thus, when the proper storage protect key is resident in the DLAT, no time is lost in accessibility. Again, storage protection does not constitute part of the invention and will not be gone into detail here.

ID Bits Stored in DLAT

In accordance with the present invention, three encoded identifier bits, referred to as the ID bits, are also associated with each DLAT entry. The primary purpose of the ID bits is to identify the translation tables that apply to the particular DLAT entry. However, they also indicate the size of the page and segment portions of the virtual address. The ID bits are generated by what is called a STO stack or just as STOK. The STOK generates ID bits into the six combinations shown in FIG. 9. Of the illustrated combinations, 010 through 111 represent different combinations of segment table of origin and page and segment sizes. When one of these six ID's is generated, it is supplied by the STOK ID generator 49 to the DLAT 46 where it is inserted with each new translation read into the DLAT 46 and compared in comparators 52 with the ID of each translation read out of the DLAT 46. When the ID read out of the DLAT 46 is identical to the ID supplied by the STOK indicated generator 49, the segment table of origin, page size and segment size used in the virtual address of the DLAT translation corespond with the segment table of origin, page size and segment size used in the virtual address now interrogating the DLAT. Thus, a DLAT compare of the ID bits occurs permitting the translation stored in the DLAT to be used to interrogate the memory. If the ID supplied by the STOK indicator generator 47 is different from that read out of the DLAT 47, it means that the STO, the page size or the segment size of the virtual address interrogating the DLAT is not the same as that of the translation and in the DLAT. In this case the wrong address has been read out of the STO stack in response to the interrogation. If this happens, a DLAT compare does not occur, preventing the translation stored in the DLAT from being used to interrogate the memory. Instead, reference is made back to the set of translation tables to generate a new translation of the virtual address into a real address. When this new translation is generated it will be inserted into the DLAT 47 with a new ID provided by the STOK as shall be seen hereinafter.

The input to the STOK ID generator 49 is the output of the word select decoder which selects one word out of six possible words stored in the STOK memory array 55. Thus, the input to the STOK generator comprises six bits of data, all but one of the bits being binary 0's and the remaining bit being a binary 1 which changes from bit position to bit position depending upon what word is being addressed in the STOK array 55. Each word of the STOK array stores bits 8 – 25 of the segment table of origin address, one bit indicating page size and one bit indicating segment size stored in the STOK array from the control registers when the particular combination of segment table of origin, page size and segment size were used. Thus, the output of the STOK ID generator is really coded information as to the location of the STOK array of the word containing the last combination of segment table of origin, page size and segment size fed into the control registers.

Figures 6B, 9:
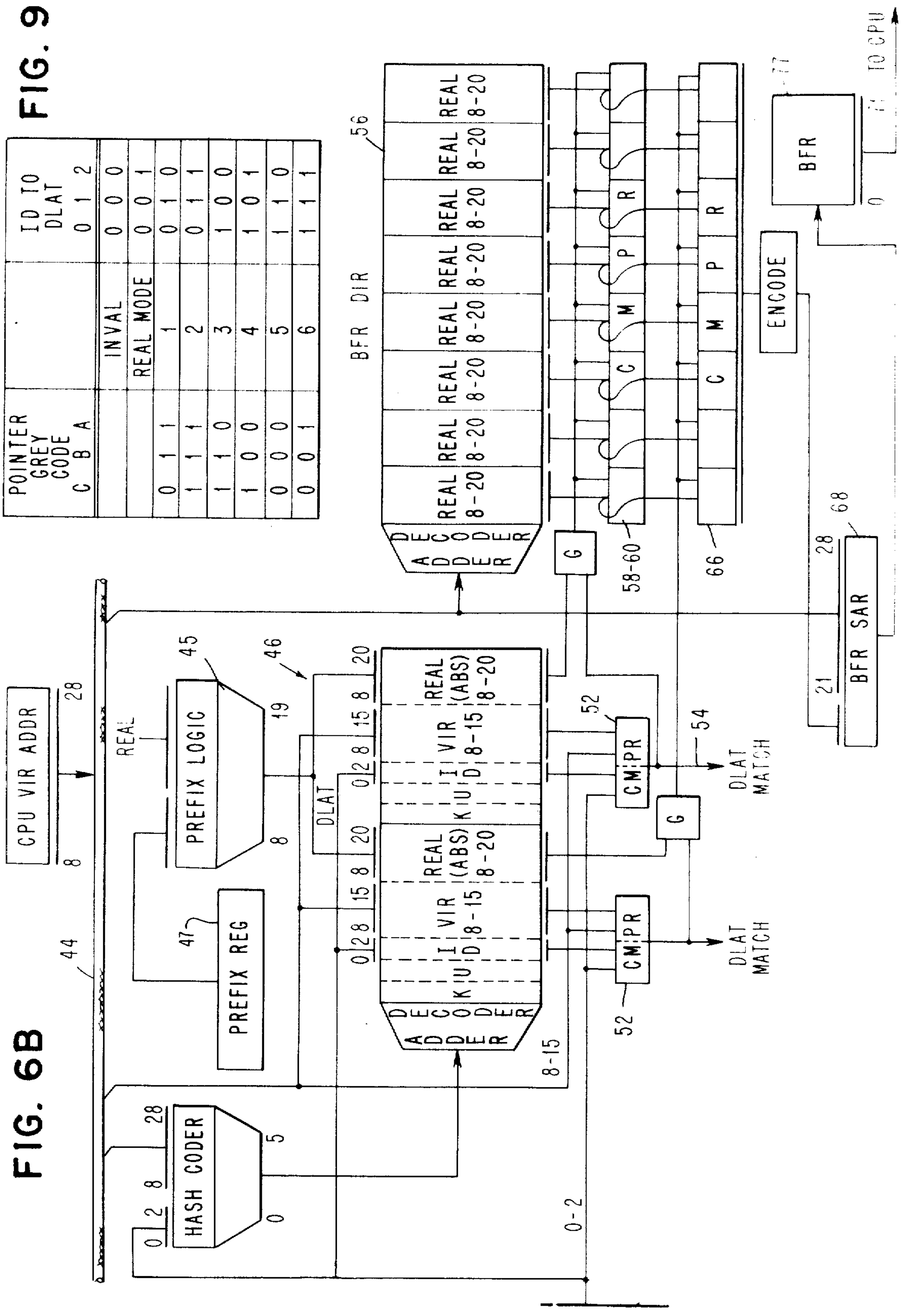
FIG. 9 is a chart of the relationship between binary and gray codes as employed in the preferred embodiment of the invention.
Figure 8:
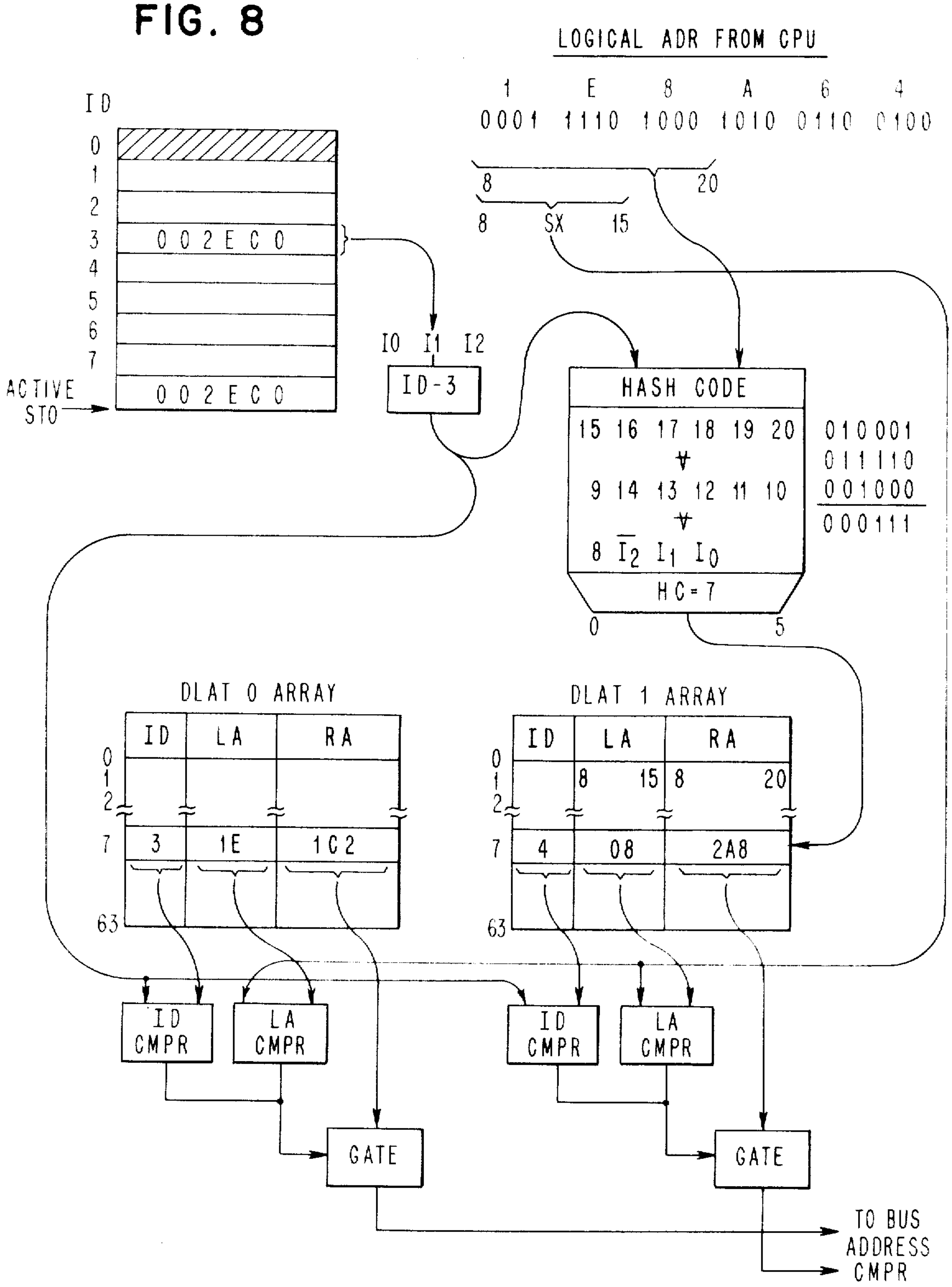
FIG. 8 is a signal flow diagram of the preferred embodiment of the invention.

A pointer 59 is the output of the stepping circuit that provides three data bits in gray code to the word select decoder 57 so that the word select decoder 57 can be addressed to access each of the six words of the STOK array in the sequence shown in FIG. 9. Details of this stepping circuit are shown in FIG. 8 and will be described in detail later. It is sufficient to know that the stepping circuit is free-running, but can be stopped at any point by a signal from a hold pointer latch 71 that provides a gating signal to the pointer 59 stopping the pointer at the word containing the bits for the last used virtual address.

An input to the hold pointer latch 71 is the output of a compare circuit which compares the output of the STOK array 55 with the data stored in the control registers 51 and when they compare, the compare circuit sends a signal to the hold pointer latch latching the latch to hold the pointer at the address of the compared bits. So long as there is no change in the page size, segment size or segment table of origin used in the virtual addresses interrogating the memory, the output of the latch 71 is held at an up level maintaining the output of the pointer stationary.

When there is a change in the segment table of origin, page size and segment size used in a particular virtual address, the hold pointer latch 71 is delatched by latch release pulse which is supplied to the HP latch 71 upon occurrence of a change thereby releasing the pointer 59 and allowing the output of the pointer to be stepped along by the counter 63 so that the word select decoder output addresses words of the STOK array in the preselected sequence. As each word is addressed, it is read out into the compare circuit 53 and compared with the data in the control registers. This continues until a comparison indicates the identity of the data in the registers 51 with that stored in one word line of the STOK array 55. The compare circuit then latches the hold pointer latch and thereby stops the pointer at the address of the word line, resulting in the compare identity. The address of the word where the comparison is made is then fed to the STOK ID generator 49 and three new coded ID bits are supplied to the DLAT 46.

If no compare identity occurs between the data stored in the STOK array 55 and that stored in the control registers 51 after the output of the stepping circuit steps the STOK array 55 once through all the words in the STOK array, the stepping circuit is stopped by the hold pointer latch 71. The output of the counter 63 is then degated by the removal of the gate counter signal GC to AND gate 65. Instead, the output of a register 67 storing the gray code digits for ordering the address for the word containing the earliest entry into the STOK array is gated through AND gate 69 to the pointer 59 from a counter 67, referred to as the first in first out counter of FIFO. The pointer 59, therefore, addresses the word select decoder 57 instructing it to generate the address of the oldest entry of the STOK array 55. The data in the control registers 51 is then stored in this word and read out resulting in an identity compare signal from comparator 53 that latches the hold pointer latch 61 and holds the pointer 59 at the address of the words being entered. A signal HF that holds the FIFO 67 stationary is then removed from the FIFO 67 allowing it to step once to the next gray code number in the sequence shown in FIG. 9, thereby storing the address in which the next entry is to be made. Once this is completed, the gate FIFO signal HF is removed and the STOK ID generator 49 supplies an ID indicative of the address of the entry to the DLAT 46.

When the data stored in any particular address in the STOK array 55 is changed in the manner described above, all the DLAT entries referring to that address must be removed from the DLAT 46. Thus, when the ID for that address is first supplied to the DLAT it is compared in compare circuits 52 with the ID's in each entry stored in the DLAT 46. Those entries with the same ID are then invalidated by replacing the ID digits with 000 so that they cannot possibly match any ID supplied by the STOK array and provide an erroneous DLAT match. This leaves the purpose of only one of the eight possible three digit ID combinations to be explained. This ID is used when the memory is being interrogated by real addresses instead of virtual address. When a real address is being used the memory goes into DAT or real mode providing a pulse to gate 81 that degates the addressed data from the input of the STOK ID generator 49 causing the STOK ID generator to generate the 001 combination of digits.

STOK Stepping Circuit

Figure 7:
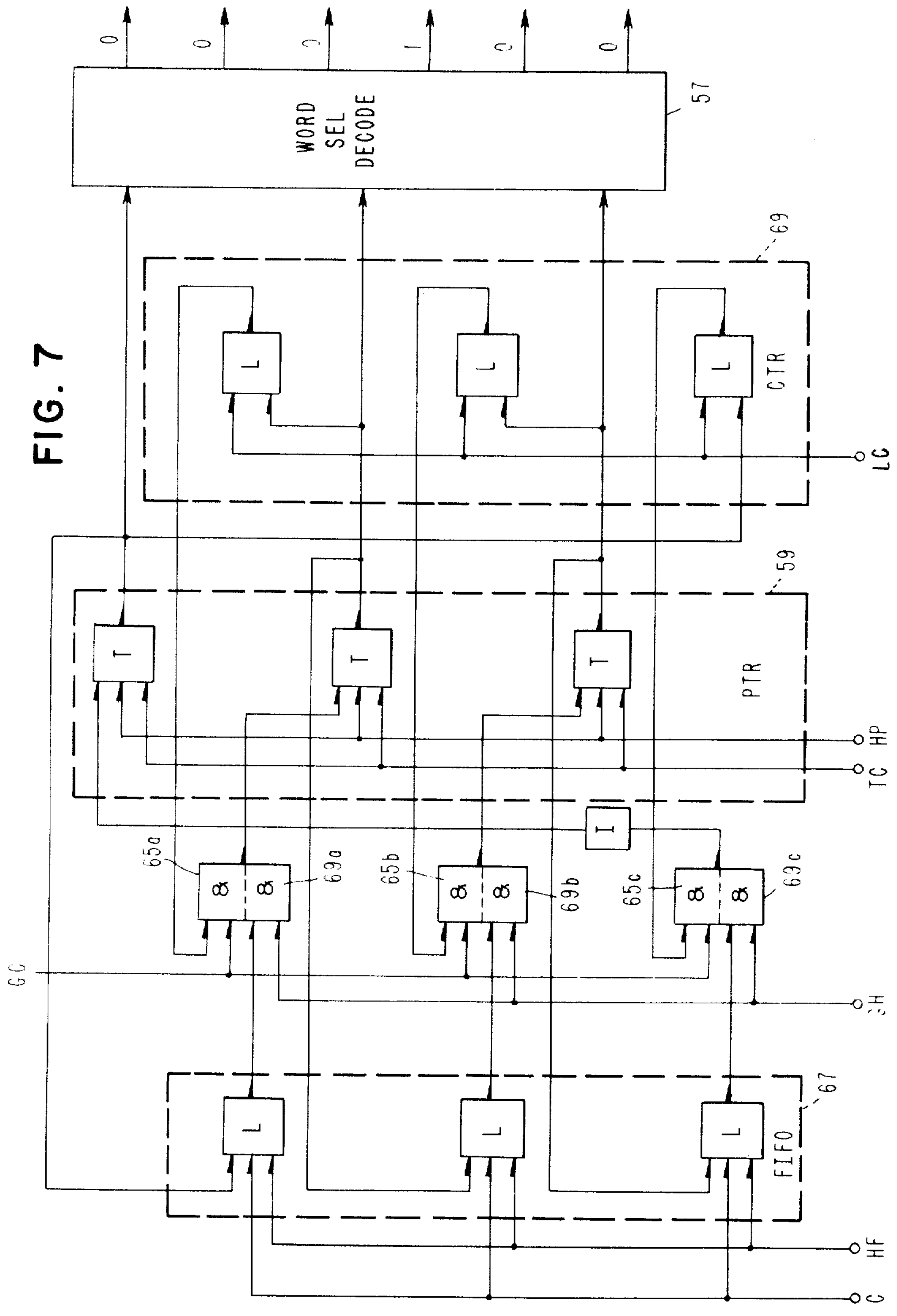
FIG. 7 is a more detailed block diagram of the stepping circuit in FIG. 6.

The details of the STOK stepping circuit of FIG. 6 are shown in FIG. 7. It can be seen in that diagram that the counter 69, the pointer 59 and FIFO 67 each comprise three AND/OR invert latches. In the diagram, the FIFO and counter latches are designated as latches while the pointer circuits are referred to as triggers. In actuality, they are all identical AND/OR invert latches, the only distinction between them being the clocking pulses sent to the counter and FIFO occur at a different time in the clocking pulse provided to the trigger. As can be seen, the output of the pointer triggers supply three bits of grey code parallel to the word select decoder 57. Each of the latches in the counter and FIFO circuit receive a clock pulse, referred to as a latch clock pulse or LC, while the latches in the pointer 59 receive a clock pulse that occurs later in time and is referred to as the trigger circuit TC. Likewise, the hold pointer goes to each of the latches in the pointer and the hold FIFO pulse is supplied to each of the latches in the FIFO. There are actually three separate sets of AND gates 65 - 69 in the stepping circuit as shown in this diagram, each addressing one of the trigger circuits instead of the one shown schematically in FIG. 6. The circuit, as shown, provides the gray code output in the sequence shown in FIG. 9 when released.

Details of DLAT Operation

The addresses of table entries used for a given program tend to occur in an ordered sequence. In order to minimize the overlaying of addresses held in the DLAT because of the usually regular sequence of these table entry addresses, the virtual address bits (8 - 20) used to address the DLAT are hashed with the active identification bits by Exclusive ORing as follows to produce a six-bit DLAT address that is random in a deterministic fashion.

| Logical Address Bits | | DLAT Address Bits |
|---|---|---|
| $15 \veebar 9 \veebar 8$ | = | 1 |
| $16 \veebar 14 \veebar \overline{ID2}$ | = | 2 |
| $17 \veebar 13 \veebar ID1$ | = | 3 |
| $18 \veebar 12 \veebar ID\emptyset$ | = | 4 |
| $19 \veebar 11$ | = | 5 |
| $20 \veebar 10$ | = | 6 |

The virtual address bits that are mapped into the DLAT are, for this preferred embodiment, bits 8, 9, 10, 11, 12, 13, 14 and 15. To translate a virtual address, the DLAT is interrogated at one of the 64 addresses and the two entries selected. Virtual bits 8 – 15 in the address provided by the CPU are compared to the high order virtual bits read out of the DLAT and the ID is matched to the currently active ID. If a match is indicated, the translated address and protection key are obtained from the real address and key fields. If no protection violation exists the real address is then compared against the buffer directory to determine if the address has been mapped into the high speed buffer. If the address is not in the buffer, main storage is referenced. When a translation is not found in the DLAT, the system performs the translation (see FIG. 2) and maps it into the DLAT.

Additional details of the preferred embodiment of the invention are shown in FIG. 6B. Bits 8 – 31 of the virtual address supplied by the CPU are supplied to a storage address bus 44 for distribution within the data processing system. Bits 8 – 20 are used to address the Directory Look Aside Table 46 which contains virtual address bits 8 – 15. Bits 8 – 15 of the virtual address provided the CPU are also furnished to comparator 52. If comparator 52 receives inputs that are equal to each other, it will generate a signal on line 54 indicating a DLAT match. At the same time that the DLAT is being accessed, the buffer directory will be accessed by bits 21 – 26 of the address provided by the CPU. These bits of the virtual address correspond to real main memory locations. Therefore, their use in addressing the directory 56 is compatible with the real address orientation of the buffer memory. In the preferred embodiment, the buffer directory contains 64 words, each of which contains four or eight real addresses, depending on optional buffer size. Bits 21 – 26, therefore, access four or eight real addresses. Bits 21 – 28 appended to the three bits designating one of the four or eight buffer directory columns contained in buffer storage address register 68 will be used to access one of 1,024 or 2,048 double words stored in high speed buffer 77 for transmission to the CPU. Bits 29 – 31 (the low order *real* address bits) of the virtual address supplied by the CPU need not be utilized in accessing the high speed buffer because, in the preferred embodiment, each double word in the buffer contains eight bytes of data, each byte consisting of eight data bits plus one parity bit. The CPU will utilize the three low order bits (bits 29 – 31) to select one of the eight bytes read from the high speed buffer. If neither comparator 58 nor 60 had sensed an equality (no buffer directory match — data not in high speed buffer) or if comparator 52 had not sensed an equality (no DLAT match — translation not already available) the situation would be handled in the manner discussed above with respect to FIG. 4.

FIG. 8 contains a flow diagram of a determination of a particular logical or virtual address in accordance with the invention described hereinabove. As can be seen, the identifier bits $I_0$, $I_1$, $I_2$ from the STO stack are hashed with bits 8 to 20 of the logical address to generate the address bits for the DLAT arrays. The data read out of these arrays are then compared with bits 8 to 15 of the logical address and with the ID bits to select one of the outputs from the DLAT and to assure that the proper real address has been accessed.

Although, in describing the preferred embodiment of the invention, various parameters were specified either explicitly or implicity, those skilled in the art will readily recognize that this invention is not limited to the formats and sizes described above. An example of an implicitly specified parameter is the size of the main or "backing" store. Since the size of the virtual memory was given as being over sixteen million bytes, and 13 bits of the virtual address were shown to be translated into 10 bits of a real address, it is clear that the real address utilized in the preferred embodiment contains somewhat over two million bytes of data.

It will also be recognized that the terms "virtual memory" and "virtual address" need not be limited to the definitions used herein. Essentially, a virtual address is an address which is changed prior to its utilization to access storage.

Those skilled in the art will further recognize the buffer accesses need not necessarily be delayed until the address comparisons have been completed. Access to the buffer could be initiated, for example, by the virtual address and, depending upon the result of the address comparisons, system usage of data read from the buffer could be inhibited (degated) later in the cycle. In such a system, the buffer would still be real-address oriented in the sense that its buffer directory would still contain real addresses.

While the invention has been particularly shown and described with reference to a preferred embodiment thereof, it will be understood by those skilled in the art that the above and other changes in form and details may be made therein without departing from the spirit and scope of the invention.

What is claimed is:

1. In a data processing system which contains a central processing unit, a main storage unit having a storage control unit and a plurality of addressable locations each addressable by a storage address, addressing means providing virtual address, and means for translating virtual addresses to real addresses including a plurality of sets of conversion tables, an improved translation control means comprising:

a. first table means for storing a plurality of previously used virtual addresses each with a real address which constitutes a translation of that virtual address using one of said sets of conversion tables;

b. second table means for storing identifying data from the storage control means indicating the particular set of tables used in generating each translation stored in the first table means;

c. coding means for generating a coded signal to the first table for storage along with each virtual to real address translation, said coding means providing the coded signals any time identifying data is addressed in the second table means;

d. first comparator means for comparing the identifying data being addressed in the second table with the identifying data supplied by the storage control means for the currently requested virtual address and providing an output signal indicating a match or mismatch of this data; and e. stepping means responsive to the signals from said comparator means for addressing in sequence different identifying data signals stored in said second table means when a mismatch signal is provided by the comparator and for addressing the address of data providing a match signal from the comparator.

2. The data processing system of claim 1 including means responsive to the currently requested virtual address for reading the same virtual address from the first table means along with the translation of that address to a real address and the coded signal indicating the set of tables used in making the translation; and a second comparison means for comparing the stored virtual address to the currently requested virtual address and for comparing the stored coded identifying data to the identifying data for the currently requested virtual address provided by the coded means.

3. The data processing system of claim 2 including means for inserting the identifying data for the currently requested virtual address into the second table means when said data has not been found therein, including:

means for storing the address of the identifying data first inserted into the second table;

means to cause the stepping means to address said address of said first inserted identifying data; and means for writing identifying data for the currently requested virtual address at said address in place of the data previously contained therein.

4. The data processing system of claim 3 wherein said coding means comprises means for receiving the address signals for the second table means and providing said coded signals as a function of the address signals.

* * * * *